May 2, 1950  J. MALDONADO  2,506,305
FORM FOR FRYING TORTILLAS TO MAKE FRIED TACOS
Filed July 21, 1947
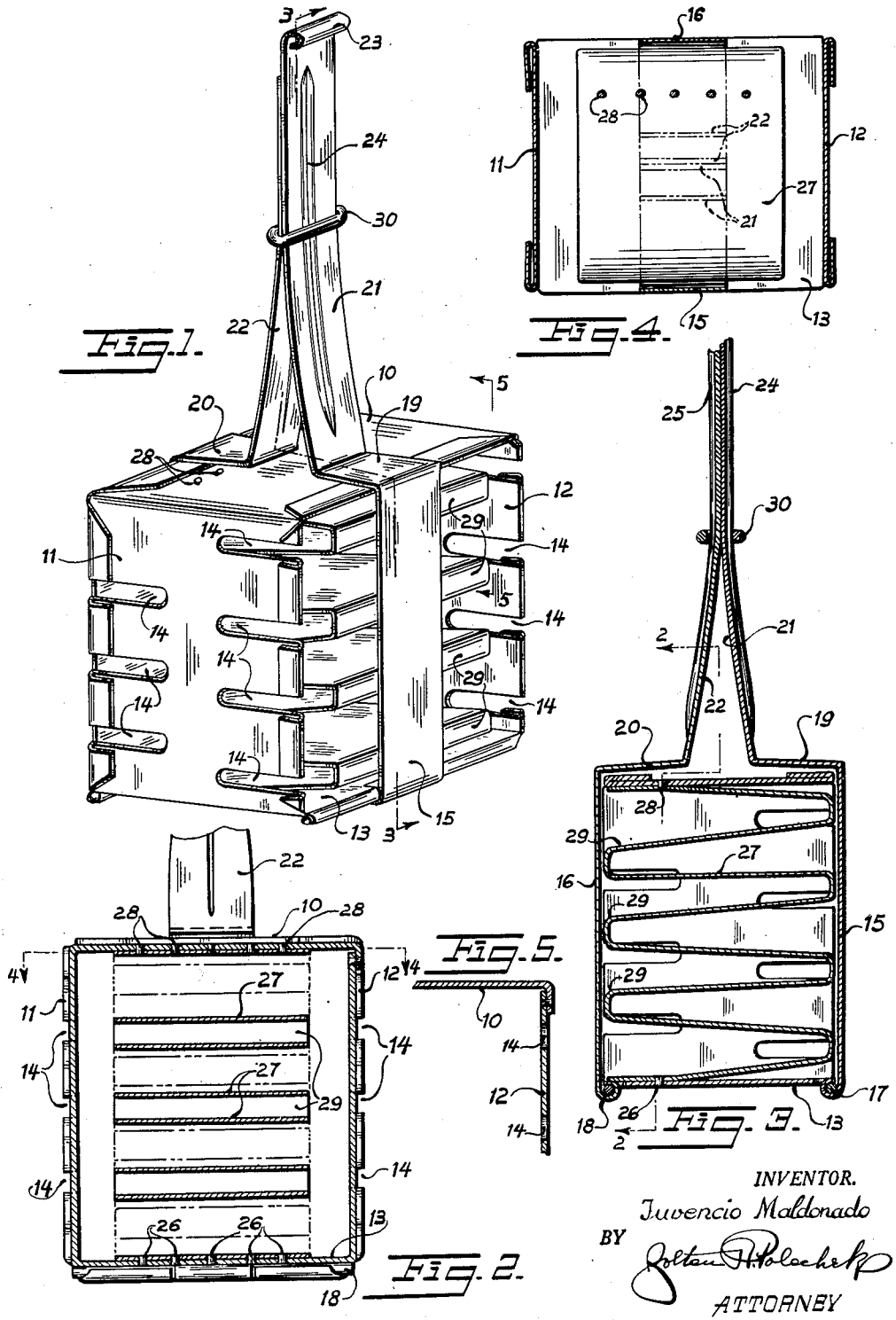
INVENTOR.
Juvencio Maldonado
BY
ATTORNEY Patented May 2, 1950

2,506,305

UNITED STATES PATENT OFFICE 2,506,305

FORM FOR FRYING TORTILLAS TO MAKE FRIED TACOS

Juvencio Maldonado, New York, N. Y.

Application July 21, 1947, Serial No. 762,477

4 Claims. (Cl. 99—426)

The present invention relates to forms for frying tortillas for tacos and it consists in the combinations, constructions and arrangements of parts herein described and claimed.

Generally, the invention comprises a form upon which a plurality of tortilla may be folded and locked in position and thereupon dipped in cooking fat or the like for a sufficient length of time to fry the tortilla, the frame thereafter being removed from the fat and the pieces of tortilla filled with meat or the like and thereafter called tacos. The construction of the form includes a frame having a pair of opposed open sides, handle members conforming in shape to the side of the frame and a portion of the top of the frame and thereafter extending upwardly to form a handle.

The upwardly extending portions are provided with outwardly extending ridges and a ring is adapted to be forced downwardly over the two upwardly extending handle portions against the faces of the ridges to lock the same together. Within the casing is a vertically arranged zig-zag mold over each separate contour of which is adapted to be placed a piece of dough, as aforesaid.

It is, accordingly, an object of the invention to provide a mold which is simple in construction, inexpensive to manufacture and efficient in operation.

A further object of the invention is the provision of a mold for tortilla dough in which a plurality of tortilla may be fried simultaneously.

A further object of the invention is the provision of a device of the character described in which the mold form consists of a single piece of metal.

A further object of the invention is the provision of a novel combined locking and handle construction.

For further comprehension of the invention and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of an embodiment of the invention.

Fig. 2 is a sectional view taken along line 2—2 of Fig. 3.

Fig. 3 is a sectional view taken along line 3—3 of Fig. 1.

Fig. 4 is a sectional view taken along line 4—4 of Fig. 2.

Fig. 5 is a fragmentary enlarged sectional view taken substantially along line 5—5 of Fig. 1.

Referring more particularly to the drawing, there is illustrated therein a form for frying tortillas to make tacos, comprised of a frame member having a top 10, side members 11 and 12 and a bottom 13. The side members are provided with a plurality of inwardly extending slots 14. The bottom 13 along the edges of the open sides of the frame is provided with a pair of arms 15 and 16 which are hinged as indicated at 17 and 18, respectively, and extend upwardly to partially enclose the open sides of the frame and thence inwardly, as indicated at 19 and 20, and thence upwardly as indicated at 21 and 22, respectively. One of the arms 15, terminates in a beaded portion 23 and both upward extensions 21 and 22 are provided with outwardly extending ridges 24 and 25, respectively.

Attached to the bottom portion 13 of the frame by means of rivets 26 or the like is a vertically extending single piece zig-zag mold 27 which is likewise attached to the top portion 10 of the frame by means of rivets 28 or the like.

The mold 27, because of its zig-zag shape, results in a plurality of outwardly extending single dough receiving portions 29. A ring 30 of the general rectangular shape is adapted to be normally held upon the extension 21 by means of the beaded portion 23 but may be slidably placed over the extension 22 and forced downwardly upon the two extension members and the ridges 24 and 25 thereof to lock the same together.

In operation, it will be seen that the handle members 15 and 16 are first unlocked and moved outwardly from the frame and that thereafter the tortilla is placed over the individual mold forms 29. The ends 15 and 16 are then brought together and the ring 30 forced downwardly over the portions 21 and 22 to frictionally lock the same together whereupon the portions 21 and 22 may be used as a handle to immerse the frame and its associated parts into grease for a period long enough to fry the tortilla. Thereafter, the device may be lifted from the grease, the slots 14 and the open sides of the mold 27 allowing the grease to rapidly drain from the unit, whereupon the handle portions 21 and 22 may be unlocked and opened and the tortilla may be removed from the mold and filled with meat or other food.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A device of the character described, comprising a base member and a top member, side members integral with said base and top members, a reversely folded member extending vertically between said side members and attached to said base and top members, said reversely folded member forming a plurality of dough receiving compartments each having an opening at one end thereof, and a pair of handles hingedly attached to said base member and extending vertically past the open ends of said dough receiving compartments.

2. A device of the character described comprising a base member and a top member, side members having a plurality of vertically spaced slots therein, said side members being integral with said top and base members, a reversely folded member extending vertically between said side members and attached to said top and base members, said reversely folded member forming a plurality of dough receiving compartments open at alternately opposite sides thereof, and a pair of handles hingedly attached to said base member and extending vertically past the alternately open and closed sides of said dough receiving compartments.

3. A device of the character described, comprising a base member and a top member, side members integral with said base and top members and having vertically spaced slots therein, a reversely folded member extending vertically between said side members and attached to said top and base members, said reversely folded member forming a plurality of dough receiving compartments open at alternately opposite sides thereof, said dough receiving compartments registering with said slots to permit the drainage of grease therefrom, and handles hingedly attached to said base member and extending vertically past the alternately open and closed sides of said dough receiving compartments.

4. A device of the character described, comprising a base member and a top member, side members integral with said base and top members, said side members being provided with vertically spaced slots therein, and a reversely folded member extending vertically between said side members and attached to said base and top members, said reversely folded member forming a plurality of dough receiving compartments open at alternately opposite sides thereof, said dough receiving compartments registering with said vertically spaced slots to permit the drainage of grease therefrom, handles hingedly attached to said base member and extending vertically past said alternately open and closed dough receiving compartments, and means locking said handles in position over said dough receiving compartments to retain the dough in said compartments during the frying process.

JUVENCIO MALDONADO.

REFERENCES CITED

The following references are of record in the file of this patent:

UNITED STATES PATENTS

| Number | Name | Date |
| --- | --- | --- |
| 285,864 | Whyte | Oct. 2, 1883 |
| 567,400 | Lee | Sept. 8, 1896 |
| 573,574 | Davies | Dec. 22, 1896 |
| 598,801 | Minter | Feb. 8, 1898 |
| 630,014 | Talbot | Aug. 1, 1899 |
| 883,432 | Traeger | Mar. 31, 1908 |
| 894,974 | Nicodemus | Aug. 4, 1908 |
| 1,020,004 | Wishman | Mar. 12, 1912 |
| 1,129,635 | Burke et al. | Feb. 23, 1915 |